United States Patent
Shen et al.

(10) Patent No.: US 6,271,633 B1
(45) Date of Patent: Aug. 7, 2001

(54) HIGH POWER FACTOR ELECTRONIC BALLAST WITH FULLY DIFFERENTIAL CIRCUIT TOPOLOGY

(75) Inventors: Eric B. Shen, Scarborough; Gert W. Bruning, Sleepy Hollow, both of NY (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/431,496

(22) Filed: Nov. 1, 1999

(51) Int. Cl.[7] .................................................. H05B 37/02
(52) U.S. Cl. ...................... 315/209 R; 315/219; 315/247
(58) Field of Search ........................ 315/209 CD, 209 R, 315/224, 225, 307, 276, 244, 219, 291, 247

(56) References Cited

U.S. PATENT DOCUMENTS

| | | | |
|---|---|---|---|
| 4,933,831 | 6/1990 | Takahashi et al. | 363/132 |
| 5,111,373 | 5/1992 | Higaki | 363/37 |
| 5,383,109 | * 1/1995 | Maksimovic et al. | 323/222 |
| 5,387,848 | * 2/1995 | Wong | 315/224 |
| 5,475,284 | 12/1995 | Lester et al. | 315/209 |
| 5,789,871 | 8/1998 | Shen et al. | 315/291 |
| 5,917,290 | * 6/1999 | Shen et al. | 315/209 R |
| 5,969,481 | * 10/1999 | Konopka | 315/209 R |
| 6,034,489 | * 3/2000 | Weng | 315/224 |

* cited by examiner

*Primary Examiner*—Haissa Philogene
*Assistant Examiner*—Wilson Lee (57) ABSTRACT

An electronic ballast circuit for driving a gas discharge lamp from a mains voltage signal supply includes a ballast bridge unit that has an upper and lower signal line. A storage capacitor is coupled across the bridge unit. The bridge unit also includes an input converter bridge having at least two switches coupled in series at an input common terminal, wherein the upper switch is coupled to the upper signal line of the ballast bridge unit and the lower switch is coupled to the lower signal line. The ballast bridge also includes an output converter bridge having at least two switches coupled in series at an output common terminal. A reference voltage signal bridge in the ballast bridge unit includes at least two switches coupled in series at a reference voltage common terminal, so as to form a first differential voltage signal between the common input terminal and the reference voltage common terminal and a second differential voltage signal between the common output terminal and the reference voltage common terminal.

15 Claims, 7 Drawing Sheets

HIGH POWER FACTOR ELECTRONIC BALLAST WITH FULLY DIFFERENTIAL CIRCUIT TOPOLOGY

FIELD OF THE INVENTION

This invention relates to an electronic ballast system and more specifically to a ballast arrangement employed for driving High Intensity Discharge (HID) lamps with a signal having a controllable frequency.

BACKGROUND OF THE INVENTION

There is an ever increasing need for gas discharge lamps, such as fluorescent lamps for both commercial and consumer applications. Gas discharge lamps are usually driven by a mains voltage supply source provided by power utility companies. In order to drive a discharge lamp from the mains voltage supply line, a ballast is employed that functions as an interface between the lamp and the supply line.

One main function of a ballast is to drive the discharge lamp with a signal that has an appropriate voltage and current level. Another important function of a ballast is to perform, what is known as, power factor correction. The voltage and current level necessary to operate the discharge lamp is governed, among other things, by the characteristics of gas contained inside the lamp. Power factor correction is necessary to insure that the operation of the ballast does not contribute noise signals to the power supply line feeding the ballast. Typically, a power factor correction arrangement controls the supply current provided by the ballast such that it remains in phase with the voltage supply line waveform.

With the advent of HID lamps, the ballasts need to also ensure that the discharge lamp is driven by a low frequency current signal, in the range of lkHz or less. Driving an HID lamp at high frequencies is usually difficult due to arc instabilities caused by acoustic resonance. This resonance can lead to lamp failure.

Figure 1:
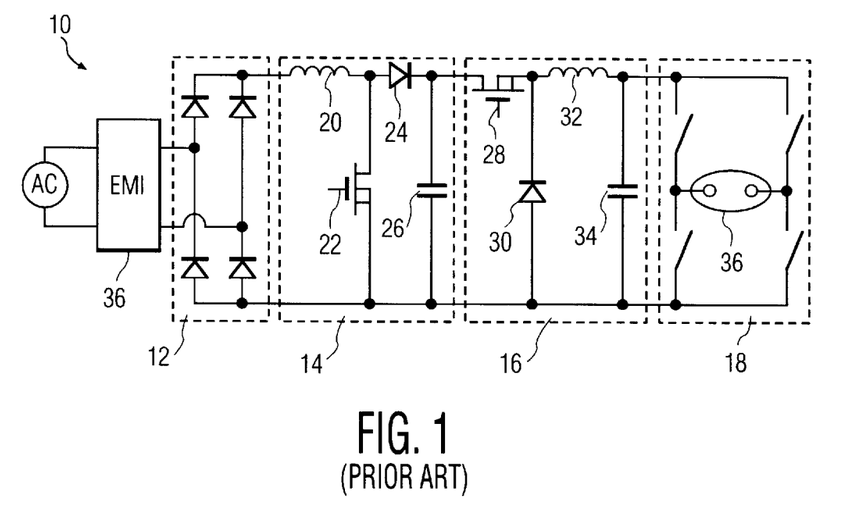
FIG. 1 illustrates a circuit diagram of a prior art ballast circuit for driving a high intensity discharge lamp.

FIG. 1 illustrates a circuit diagram of a typical ballast 10 employed to drive an HID lamp. The operation of ballast 10 is very well understood and is not described in detail herein. The ballast circuit includes an upper signal line and a lower signal line each coupled to a respective terminal of mains power supply line. Ballast 10 comprises an EMI filter 36 followed by a full bridge diode rectifier 12 to rectify the ac voltage signal provided by the mains supply line. The rectified signal is then fed to a preconditioner stage, such as a boost converter 14, which operates to shape the ballast supply current, also referred to as mains current, for power factor correction.

The preconditioner is followed by an energy storage capacitor 26, which accumulates a dc bus voltage $V_{bus}$, which is typically larger than the peak voltage level provided by the mains power supply line. Boost converter 14 includes an inductor 20 having inductance $I_L$, along the upper signal line of ballast 10, coupled in series with a diode 24, which in turn is coupled to storage capacitor 26. A transistor switch 22 is coupled across inductor 20 and lower signal line of the ballast. The duty cycle of switch 22 can be controlled so as to operate the boost converter in different operation modes.

For example, boost converter 14 can operate under, what is known as, a continuous conduction mode operation (CCM). During this mode of operation, the average voltage across capacitor 26 is $$V_{26} = V_{in}/(1 = D(t))$$

wherein $V_{in}$ is the voltage signal fed to boost converter 14 and D(t) a variable duty cycle of switch 22. A controller (not shown) varies the duty cycle of switch 22 so that the current $I_L$ has a sinusoidal shape that is in phase with the mains voltage supply waveform. Other control operation modes for boost converter 14 include discontinuous conduction mode operation (DCM) and critical discontinuous conduction mode operation (CDCM), which may be employed based on various design considerations. For a continuous conduction mode operation, the average voltage signal across inductor 20 is substantially zero.

Boost converter 14 is followed by a buck converter 16 that is fed by the dc bus voltage signal formed across capacitor 26. A transistor switch 28 couples capacitor 26 to an inductor 32, which in turn is coupled to a filter capacitor 34. A diode 30 is coupled across switch 28 and lower signal line of the ballast. The buck converter creates a dc current which drives the lamp through a commutator stage 18.

Commutator stage 18 includes four transistor switches, which interchangeably operate to switch the current signal provided to lamp 36. The commutator inverts the lamp polarity at a low frequency, typically in the 100 Hz range.

One disadvantage with the ballast circuit described in FIG. 1 is that it suffers from a high component count and poor converter efficiency. There has been some effort to reduce the number of components of a ballast for driving HID lamps. One approach is to synchronize the lamp current to the power supply voltage frequency, as described in U.S. Pat. No. 5,917,290, entitled Parallel-Storage Series-Drive Electronic Ballast. The disadvantage with such a ballast circuit is that when the frequency of the power voltage supply signal is low, for example 50 Hz, there is the possibility of a visible light flicker from the lamp.

Thus, there is a need for an efficient and simple ballast circuit, having a low component count and a driving current signal that has a controllable frequency to avoid possible light flicker.

SUMMARY OF THE INVENTION

In accordance with one embodiment of the invention an electronic ballast circuit includes a ballast bridge unit configured to receive a ballast supply signal from a mains voltage supply line via an input inductor. The ballast bridge unit comprises an input converter bridge having at least two transistor switches coupled in series at a common terminal, wherein an upper transistor switch is coupled to the upper signal line of the ballast bridge unit and the lower transistor switch is coupled to the lower signal line of the ballast bridge unit. The transistor switches of the input converter bridge unit are operated such that the average voltage signal level of their common input terminal is set at a desired value, and the input converter current waveform follows the mains voltage supply signal waveform.

The ballast bridge unit further comprises an output converter bridge having at least two transistors switches coupled in series at an output common terminal, wherein an upper transistor switch is coupled the upper signal line of the ballast bridge unit and the lower transistor switch is coupled to the lower signal line of the ballast bridge unit. The transistor switches of the output converter bridge are operated such that the average voltage signal level of their common output terminal shifts between two desired values, so as to form an ac current for driving a gas discharge lamp.

The ballast bridge unit also comprises a reference voltage signal bridge having at least two transistor switches coupled in series at a reference voltage common terminal, wherein an upper transistor switch is coupled to the upper line of the ballast bridge unit and the lower transistor switch is coupled to the lower signal line of the ballast bridge unit. The transistor switches of the reference voltage signal bridge are operated such that the average voltage signal level of their common terminal is set at a desired reference voltage signal so as to form a first differential voltage signal between the common input terminal voltage signal and the reference voltage signal and to form a second differential voltage signal between the common output terminal voltage signal and the reference voltage signal.

The common output terminal of the ballast bridge unit is coupled to a filter capacitor via an output inductor so as to provide a driving signal to a gas discharge lamp disposed across the filter capacitor.

During operation, the average voltage signals at the common terminals of the three signal bridges are controlled so as to regulate the input current signal of the ballast to be sinusoidal and in phase with the mains voltage signal and the lamp driving current signal to be a low frequency square wave of arbitrary and specifiable frequency independent of the frequency of the mains voltage signal.

The arrangement of the ballast circuit in accordance with the principles of the present invention provides for a simple design with low number of component parts that generates a lamp driving current that has a desirable frequency above a range that causes visible light to flicker.

DETAILED DESCRIPTION OF THE DRAWINGS

Figure 2:
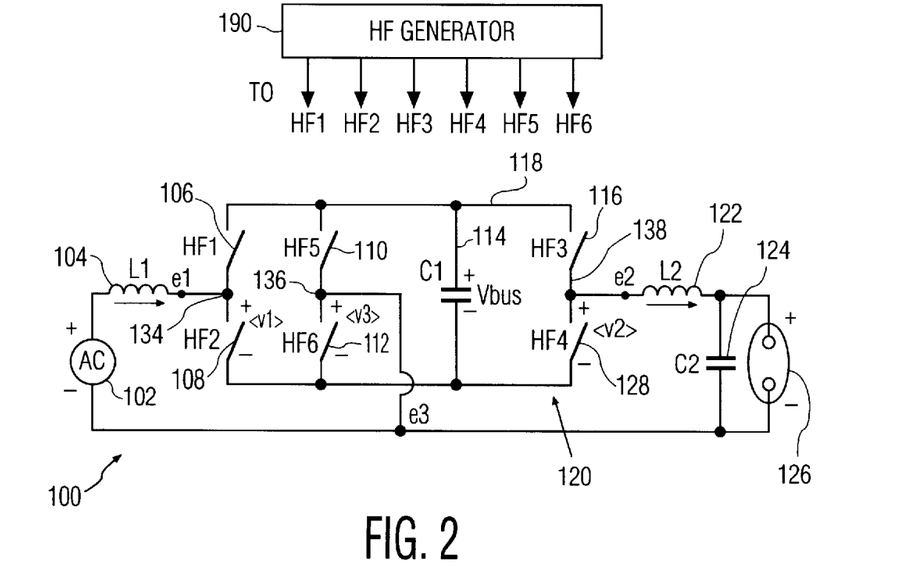
FIG. 2 illustrates a circuit diagram of a ballast circuit in accordance with one embodiment of the invention.

FIG. 2 illustrates an electronic ballast circuit 100 in accordance with one embodiment of the present invention. Voltage supply source 102 represents the mains ac power supply voltage signal. Voltage supply source 102 is coupled to an input inductor 104 having an inductance $L_1$. Input inductor 104 is coupled to a ballast bridge unit 132.

Ballast bridge unit 132 includes an input converter bridge that contains two high frequency switches 106 and 108 coupled in series. The common terminal 134 of the input converter bridge is coupled to inductor 104. Upper switch 106 is coupled to the upper signal line 118 of the ballast bridge unit, whereas the lower switch 108 is coupled to the lower signal line 120 of the ballast bridge unit. As will be explained in more detail below, the input converter bridge in accordance with one embodiment of the present invention as illustrated, functions similarly to a boost converter.

Ballast bridge unit 132 also includes a reference voltage signal bridge that contains two high frequency switches 110 and 112 coupled in series. The common terminal 136 of the reference voltage signal bridge is coupled to the lower signal line of the ballast circuit. Upper switch 110 is coupled to the upper signal line 118 of the ballast bridge unit, whereas the lower switch 112 is coupled to the lower signal line 120 of the ballast bridge unit.

Ballast bridge unit 132 further includes an output converter bridge that contains two high frequency switches 116 and 128 coupled in series. The common terminal 138 of the output converter bridge is coupled to an output inductor 122. Upper switch 116 is coupled the upper signal line 118 of the ballast bridge unit, whereas the lower switch 128 is coupled to the lower signal line 120 of the ballast bridge unit. As will be explained in more detail below, the output converter bridge in accordance with one embodiment of the present invention as illustrated, functions similarly to a buck converter.

Finally, ballast bridge unit 132 includes a high voltage storage capacitor 114 coupled across the upper and lower signal lines of the ballast bridge unit.

Ballast circuit 100 further includes a filter capacitor 124 and a lamp 126 coupled in parallel, configured to be driven by the current provided through output inductor 122, which has an inductance $L_2$.

During operation, high frequency switches 106 and 108 are operated at a high frequency, for example 100 kHz, with inductor 104 to regulate the current signal flowing through input inductor 104.Similarly, switches 116 and 128 are operated at a high frequency with inductor 122 to regulate the current signal driving lamp 126.Switches 110 and 112 are also operated at a high frequency to control the average reference voltage at a desired value. The arrangement of the ballast circuit 100 can control the frequency of the lamp driving current signal, provided the right control conditions for switching the switches in the ballast bridge unit are met.

It is noted that input inductor 104 in combination with switches 106 and 108 and energy storage capacitor 114 form an input converter, which functions principally as a boost converter. Furthermore, switches 116, 128 in combination with output inductor 122 and filter capacitor 124 form an output converter, which functions principally as a buck converter. However, unlike the ballast circuit described in FIG. 1, ballast circuit 100 operates without a full bridge rectification stage and a commutator stage. As such, ballast circuit 100 has considerably less component count than the prior art circuit illustrated in FIG. 1.

The operation of ballast circuit 100 is described in more detail hereinafter. In accordance with one embodiment of the present invention, both the input converter and the output converter of ballast circuit 100 operate under continuous conduction mode (CCM) operation. To this end, the current signals in inductors 104 and 122 remain continuous and do not reach zero. The voltage level across energy storage capacitor 114 is substantially constant, forming a dc bus voltage $V_{bus}$. The input converter bridge, the reference voltage signal bridge and the output converter bridge together comprise three pairs of high frequency switches that are coupled in parallel with storage capacitor 114, and are operated by pulse width modulated PWM control signals each having a specifiable duty cycle D.

Thus, if the duty cycle of switch 106 is D1, then the average voltage signal across switch 108 labeled <v1> is $D1 \times V_{bus}$.

Similarly, if the duty cycle of switch 116 is D2, then the average voltage signal at common output terminal 138 labeled <v2> is $D2 \times V_{bus}$.

Finally, if the duty cycle of switch 110 is D3, then the average voltage signal at common reference voltage terminal 136 labeled <v3> is $D3 \times V_{bus}$.

Thus, via the high-frequency generator 190, switches 106, 110 and 116 are turned "on" for their respective duty cycles D1, D2, and D3. When these switches are turned "off" the lower switches 108, 112 and 128 are turned "on." By controlling the average voltage signals, <v1> , <v2> , and <v3 > , ballast circuit 100 achieves a satisfactory power factor correction on the input converter current and provides a low frequency square wave driving current signal having a frequency independent of the frequency of the power supply voltage signal.

As a specific example, the duty cycle of switch 110 can be set at 50%. Thus, the average voltage signal level <v3> reaches one half of the bus voltage signal $V_{bus}$ . As such, voltage signal level <v1> requires to be controlled such that there is substantially no average voltage across inductor 104 . Therefore, the differential voltage signal <v1> minus <v2> require to be the same as the mains voltage signal level provided by voltage signal source 102. It is noted that a small modulation voltage signal across inductor 104 is necessary to generate a sinusoidal current signal in $L_1$ having the same frequency as the frequency of the mains voltage signal source. This modulation voltage signal can be generated via a feedback control arrangement (not shown).

Similarly, there is substantially little or no average voltage across output inductor 122, so the differential voltage <v2> minus <v3> must be the lamp voltage. Because the average voltages <v1> , <v2> , and <v3> cannot be greater than voltage level $V_{bus}$ (at 100% duty cycle), the voltage signal $V_{bus}$ across capacitor 114 must be sufficiently large enough to generate the voltages sufficient for proper operation of ballast circuit 100.

To further illustrate this example, a U. S. mains voltage signal having 12 Vrms with a peak voltage of approximately 170 volts is considered generated by signal source 102. Lamp 126 is driven by a 100 volts signal level and $V_{bus}$ is configured to be set at 400 Volts. During operation switch 110 is operated at a 50% duty cycle so that the average voltage <v3> is 200 Volts. The differential voltage <v1> minus <v3> must be approximately the same as the voltage signal generated by signal source 102. Therefore, on the positive half cycle of the signal source 102, as the source signal level goes from 0 volt to 170 Volts and back to 0 volt, voltage signal <v1> goes from 200 Volts to a peak of 370 Volts and back to 200 Volts. On the negative half cycle, as the source signal level goes from 0 Volt to −170 Volts and back to 0 Volt, then <v1> goes from 200 Volts to 30 Volts back to 200 Volts. As such the 400 Volt value for $V_{bus}$ is a sufficient to accommodate the required voltages. On the lamp side, the differential voltage <v2> minus <v3> is the lamp voltage. So as the lamp voltage alternates from 100 Volts to −100 Volts the voltage signal <v2> alternates between 300 Volts to 100 Volts. As explained above, however, the driving signal frequency can be totally independent from the frequency of the mains supply signal.

Thus, in accordance with the principles of the present invention, the minimum bus voltage $V_{bus}$ must be large enough to accommodate the largest voltage swing required. In the example described above, the mains voltage swings a total of 340 Volts peak to peak. The lamp voltage swings a total of 200 Volts peak to peak. Therefore, the minimum voltage for $V_{bus}$ would be 340 Volts, and <v3> would be set to one half of this, or 170 volts. For practical reasons, some margin may be advantageously necessary, and the original example of a 400 Volts for $V_{bus}$ is preferable. In any event, it can be concluded that in accordance with one embodiment of the invention, $V_{bus}$ must be greater than either twice the peak mains voltage, or twice the lamp voltage, whichever is greater.

Figure 3:
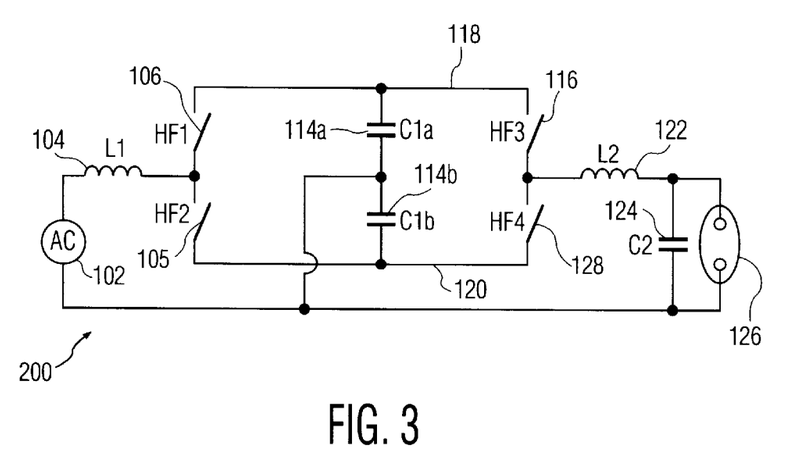
FIG. 3 illustrates a circuit diagram of a ballast circuit in accordance with another embodiment of the invention.

FIG. 3 illustrates another embodiment of a ballast circuit 200 in accordance with the principles of the present invention. Bridge unit 232 includes a capacitive divider comprising capacitors 114 a and 114 b coupled in series across the upper and lower signal lines of the bridge unit. Unlike bridge unit 132 illustrated in FIG. 2, bridge unit 232 does not have a reference voltage bridge with transistor switches 110 and 112. Instead, capacitive divider pair 114 a and 114 b passively function to set the average voltage signal <v3> to half the bus voltage $V_{bus}$. It is noted that the arrangement of ballast circuit in accordance with the embodiment illustrated in FIG. 3 requires two switches less than ballast circuit 100 (FIG. 2), which also leads to less losses associated with the operation of such switches.

It should be noted that average reference voltage signal <v3> need not be set to half the voltage signal $V_{bus}$ in the arrangement illustrated in FIG. 2. For example, it is possible to set <v3> such that the total voltage signal $V_{bus}$ required is the sum of the peak mains voltage signal and the lamp voltage. For ballast circuit 100, the minimum voltage signal $V_{bus}$ necessary would be 27 Volts, instead of 340 Volts. Table 1 illustrates the values of <v3> needed to implement the minimum $V_{bus}$ signal levels necessary to operate the ballast circuit in accordance with various embodiments of the invention. Although the control arrangement to maintain a minimum $V_{bus}$ signal level is more complex than the arrangement described in reference with FIG. 2, a lower bus voltage $V_{bus}$ requires a lower rated capacitor. Furthermore, the switching losses for switches 110 and 112 are also reduced.

|  | Vlamp > 0 | Vlamp < 0 |
|---|---|---|
| Vmains > 0 | <V3> = 0 | <V3> = \|Vlamp\| |
| Vmains < 0 | <v3> = $V_{bus}$ − Vlamp | <v3> = Vbus |

Figure 4:
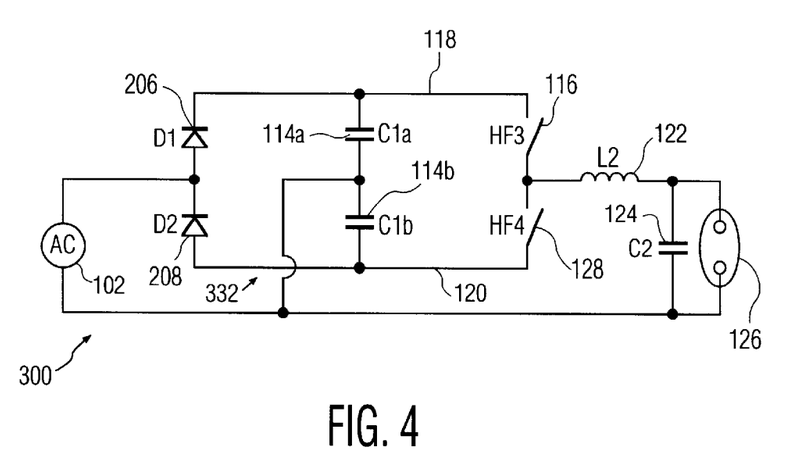
FIG. 4 illustrates a circuit diagram of a ballast circuit in accordance with yet another embodiment of the invention.

FIG. 4 illustrates yet another ballast circuit 300 in accordance with another embodiment of the invention. It is noted that for some applications, for example, low power compact HID lamps, it may not be necessary to perform power factor correction. As a result the topology described in connection with FIG. 2 and 3 is further simplified as illustrated in FIG. 4.

Ballast circuit 300 includes a ballast bridge unit 332 that includes a diode bridge 206 and 208 coupled in series. Diode 206 is coupled to the upper signal line of ballast bridge unit 332, while diode 208 is coupled to its lower signal line. Capacitors 114a and 114b, and high frequency switches 116, 128 in combination with inductor 122, and filter capacitor 124 are arranged to operate in accordance with the embodiments previously described in connection with FIGS. 2 and 3.

During the operation, the connection of the mains power supply voltage to diodes 206 and 208 and capacitors 114a and 114b forms a voltage doubler circuit. When the mains power supply voltage is positive, capacitor 114a is charged through diode 206. Similarly, when the mains power supply voltage is negative, capacitor 114b is charged through diode 208. The total bus voltage across both capacitors 114a and 114b increases to be substantially equal to double the peak voltage value of the mains power supply voltage. Thus, for United States 12 Vrms line, the bus voltage $V_{bus}$ will be around 340 Volts. Switches 116 and 128 are operated at high frequency pulse width modulated arrangement to deliver a low frequency square wave of current to the lamp as described in connection with ballast circuits illustrated in FIGS. 2 and 3.

Figure 5A:
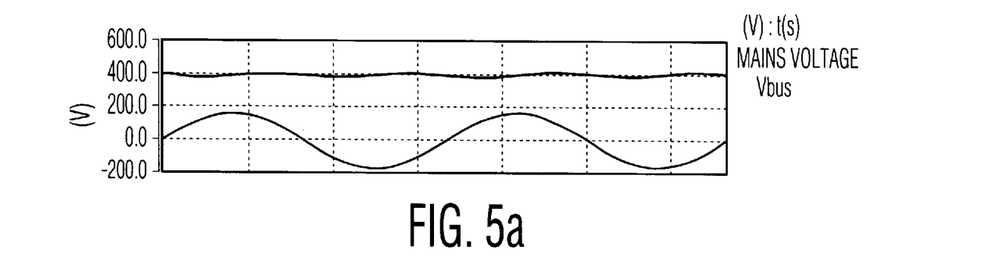
FIGS. 5(a)–5(d) are plots of waveforms representing signals generated by the ballast circuit illustrated in FIG. 2 providing a 120 Hz output frequency.
Figure 5B:
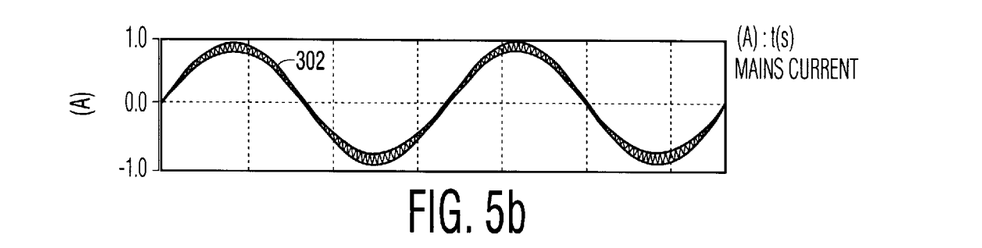

FIG. 5a–5d illustrate the waveforms generated in connection with the operation of an electronic ballast circuit, such as the one illustrated in FIG. 2. Specifically, FIG. 5a illustrates voltage signal $V_{bus}$ which is set to about 400 Volts, and the voltage signal provided by mains power supply line. As illustrated, the mains voltage signal swings between positive and negative 170 Volts. The output frequency of the signal driving lamp 126 is configured to be 120 Hz. FIG. 5(b) illustrates the current signal 302 flowing through input inductor 104, which is in phase with the mains voltage signal (FIG. 5a). It is noted that current signal 302 exhibits substantially little or no cross-over distortion. Cross-over distortion occurs in many power factor correction schemes.

Typically, in an input converter, the power factor correction arrangement attempts to shape the input conductor current to follow a rectified sinusoidal voltage signal provided from the mains voltage signal supply. When the mains voltage signal is at zero level, the slope for the input inductor current signal is either positive or negative, indicating an increase or decrease in the current signal. However, for conventional boost converters, when the mains voltage signal is at zero level, there is no current flow through the boost converter. The current begins flowing sometime after the mains voltage signal level increases and becomes in phase with the mains voltage signal. Thus, the current flow waveform maintains a zero slope phase followed by an increasing slope to catch up with the phase of the mains voltage signal. The waveform distortion because of the zero slope phase is known as cross-over distortion.

Figure 7:
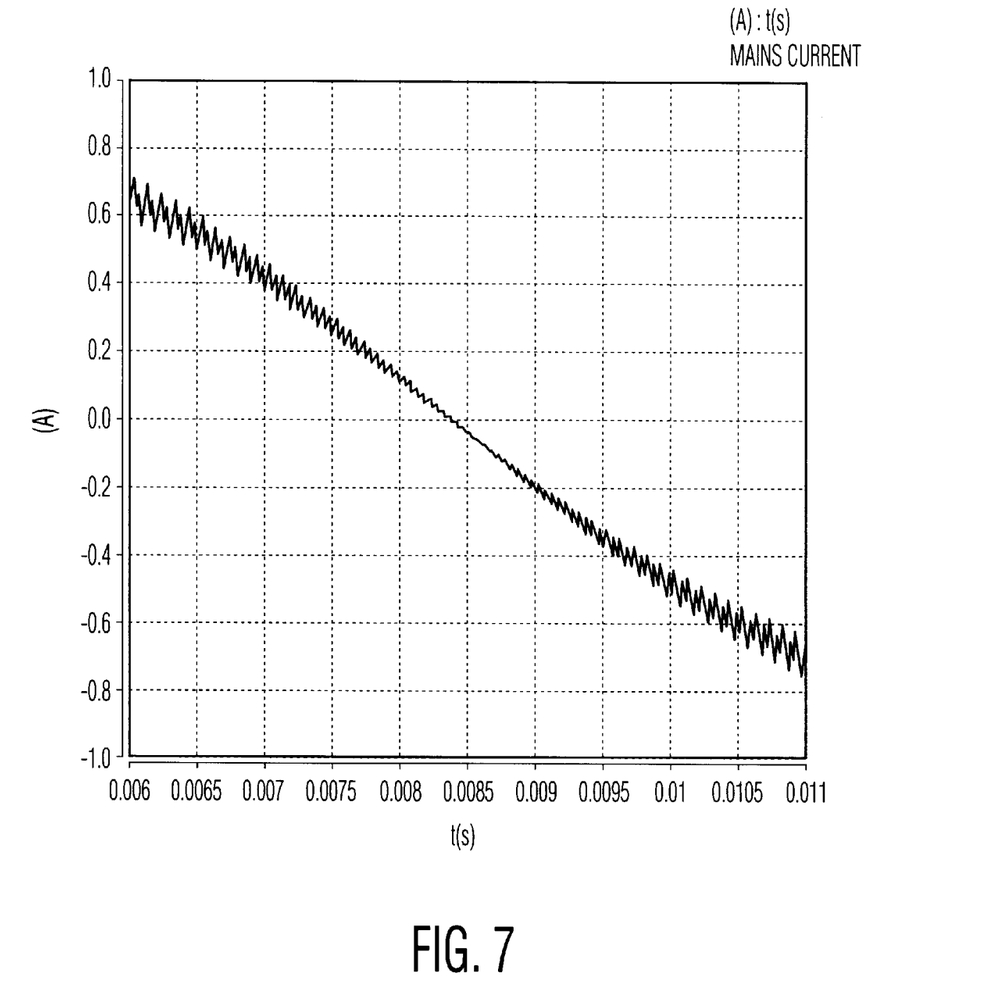
FIG. 7 illustrates a plot of a waveform representing the input inductor current experiencing no cross over distortion in accordance with one embodiment of the present invention.
Figure 8A:
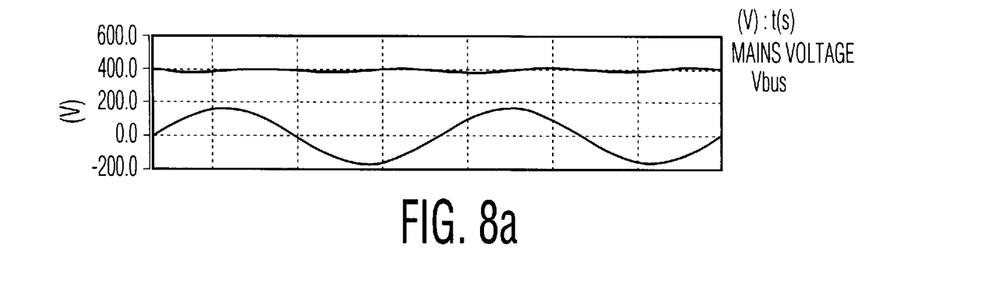
FIGS. 8(a)–8(d) are plots of waveforms representing signals generated by the ballast circuit illustrated in FIG. 3 providing a 120 Hz output frequency.
Figure 8B:
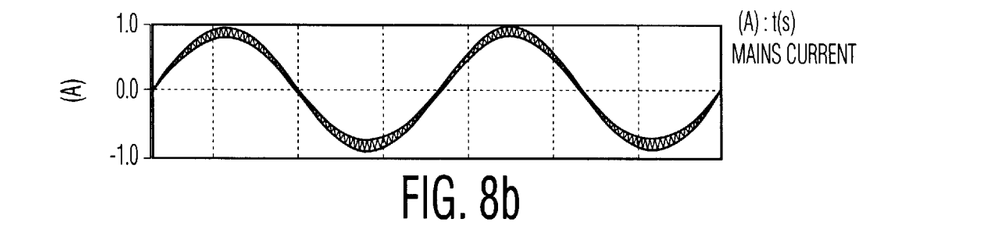
Figure 8C:
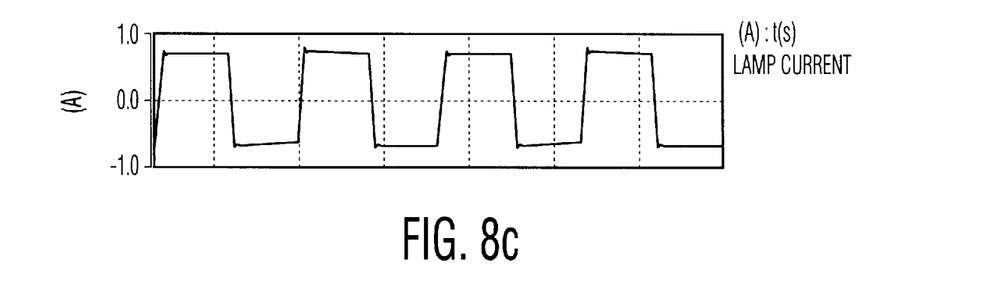
Figure 8D:
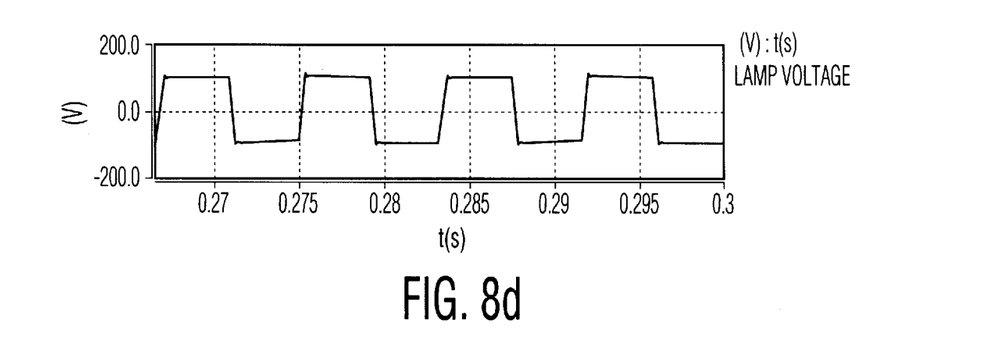

The ballast circuit in accordance with the principles of the present invention avoids the cross-over distortion explained above. For example, in reference with FIG. 2, because it is possible to control the voltage signal level at node 134 in relation to node 136, it is possible to maintain a voltage potential across inductor 104 so as to eliminate cross-over distortion as more clearly illustrated in FIG. 7.

Figure 5C:
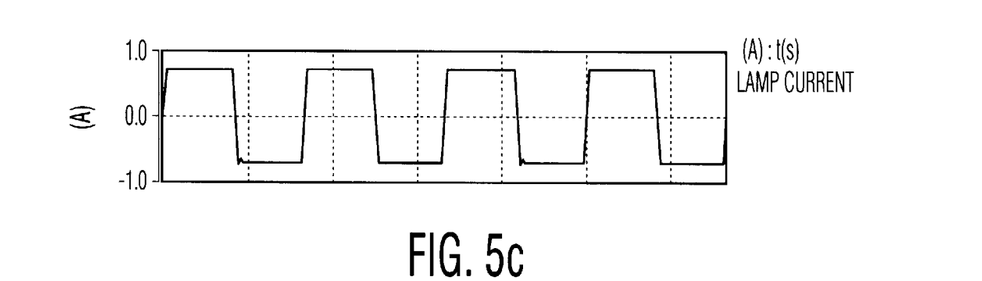
Figure 5D:
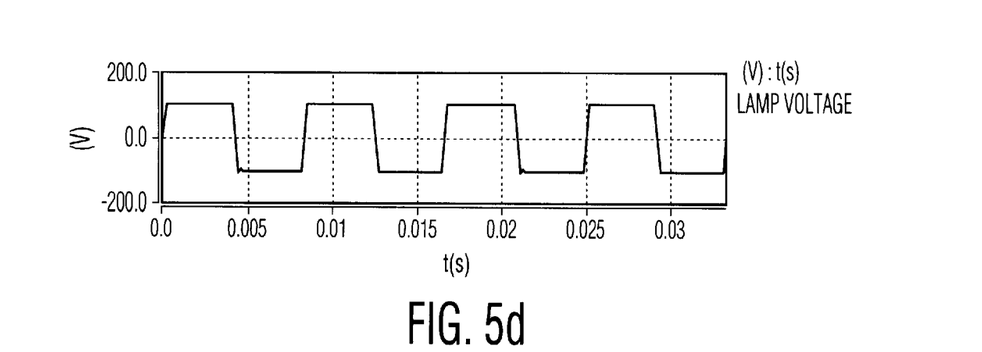
Figure 6A:
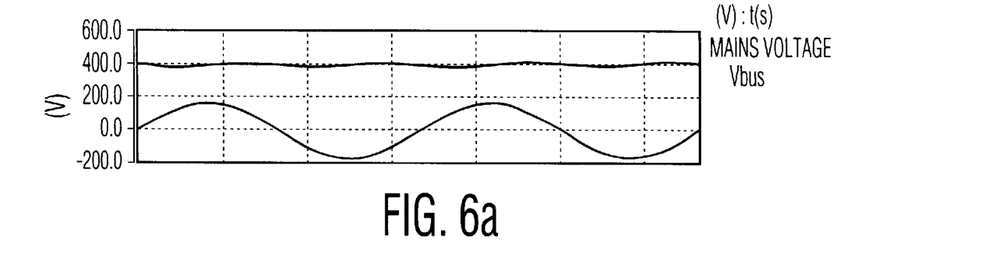
FIGS. 6(a)–6(d) are plots of waveforms representing signals generated by the ballast circuit illustrated in FIG. 2 providing a 200 Hz output frequency.
Figure 6B:
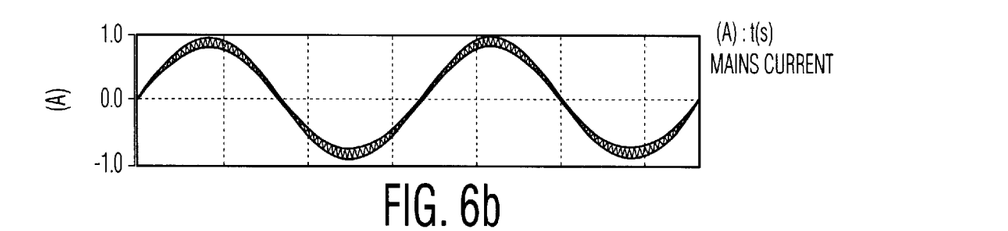
Figure 6C:
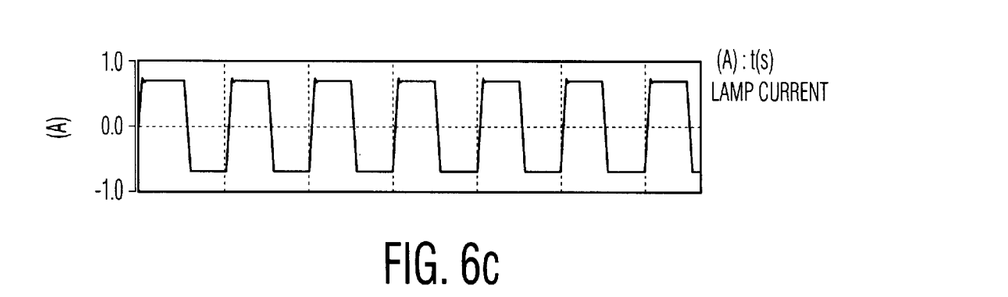
Figure 6D:
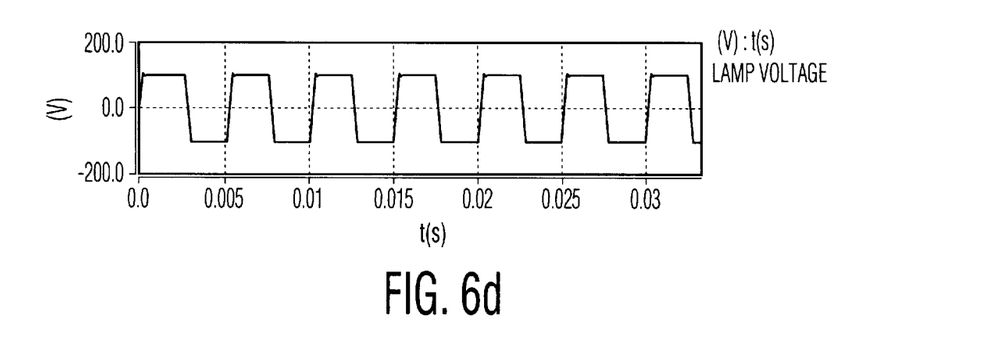

FIG. 5(c) illustrates the lamp current signal flowing through inductor 122, while FIG. 5(d) illustrates the lamp voltage signal across capacitor 124.

FIG. 6(a)–6(d) illustrate the waveforms generated in connection with the operation of the electronic ballast circuit, such as the one illustrated in FIG. 2, wherein the frequency of the driving signal is configured to be 200 Hz.

FIGS. 8(a)–8(d) illustrate the waveformg generated in connection with the operation of the electronic ballast circuit, such as the one illustrated in FIG. 3, wherein the frequency of the driving signal is configured to be 120 Hz.

Figure 9A:
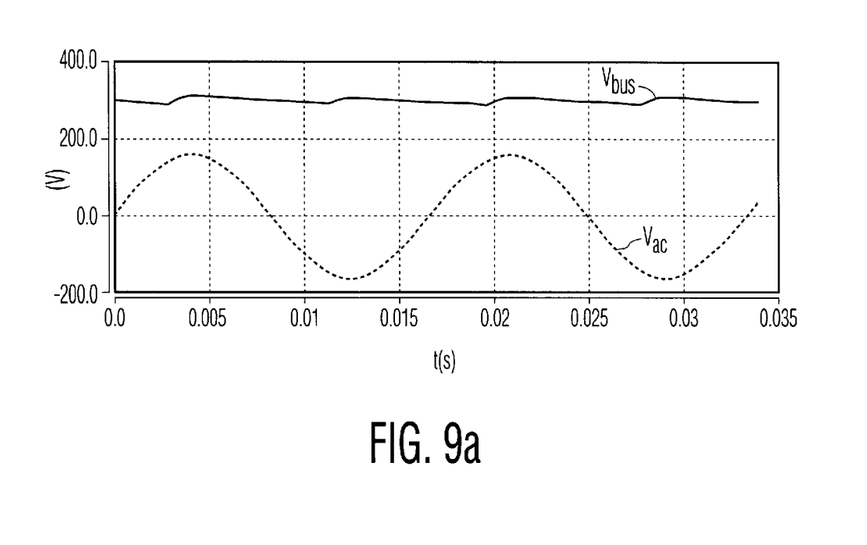
FIGS. 9(a)–9(b) are plots of waveforms representing signals generated by the ballast circuit illustrated in FIG. 4, providing a 120 Hz output frequency.
Figure 9B:
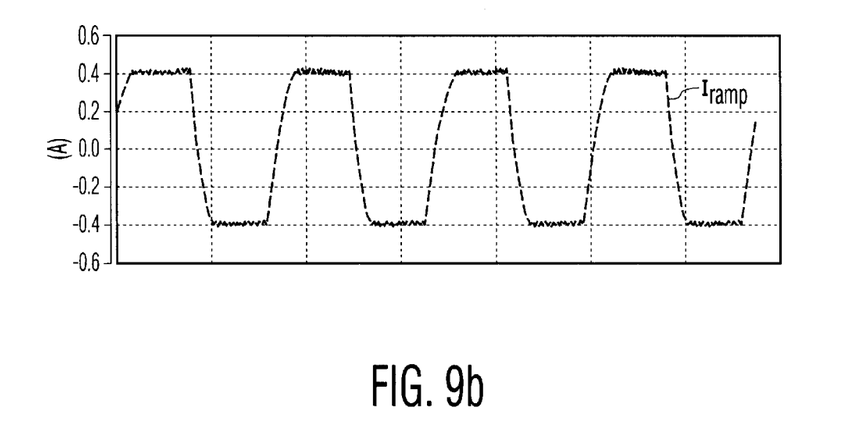

Finally, FIGS. 9(a)–9(b) illustrate the waveforms generated in connection with the operation of the electronic ballast circuit, such as the one illustrated in FIG. 4. Specifically, FIG. 9(a) illustrated the voltage signal $V_{bus}$ formed across the coupled capacitors 114a, 114b, and the mains voltage signal level, while, FIG. 9(b) illustrates the current signal flowing through output inductor 122.

While only certain features of the invention have been illustrated and described herein, many modifications, substitutions, changes or equivalents will now occur to those skilled in the art. It is therefore, to be understood that the appended claims are intended to cover all such modifications and changes that fall within the true spirit of the invention.

We claim:

1. In an electronic ballast circuit for driving a gas discharge lamp from a mains voltage signal supply, a ballast bridge unit having an upper and lower signal line comprises:

a storage capacitor coupled across said upper and lower bridge unit signal lines;

an input converter bridge having at least two switches coupled in series at an input common terminal, wherein an upper switch of said input converter bridge is coupled to the upper signal line of the ballast bridge unit and the lower switch of said input converter bridge is coupled to the lower signal line of the ballast bridge unit;

an output converter bridge having at least two switches coupled in series at an output common terminal, wherein an upper switch of said output converter bridge is coupled to the upper signal line of the ballast bridge unit and the lower switch is coupled to the lower signal line of the ballast bridge unit;

reference voltage signal bridge having at least two switches coupled in series at a reference voltage common terminal, wherein an upper switch of said reference voltage signal bridge is coupled to the upper signal line of said ballast bridge unit and the lower switch of said reference voltage signal bridge is coupled to the lower signal line of the ballast bridge unit; and a high-frequency generator that is configured to alternately switch the at least two switches of the reference voltage signal bridge at a frequency that is substantially higher than a frequency of the mains voltage supply, so as to form a first differential voltage signal between said common input terminal and said reference voltage common terminal and a second differential voltage signal between said common output terminal and said reference voltage common terminal.

2. The invention in accordance with claim 1 wherein said switches of said ballast bridge unit are high frequency switching transistors.

3. The invention in accordance with claim 2, wherein said common terminal of said input converter bridge is coupled to an input inductor, and said common terminal of said output converter bridge is coupled to an output inductor and said common terminal of said reference voltage signal bridge is coupled to one terminal of a mains power supply line.

4. The invention in accordance with claim 2, wherein the high-frequency generator is firer configured to change the operation of the output converter bridge between a first and a second duty cycle at a rate defined by frequency of current signal driving said gas discharge lamp.

5. The invention in accordance with claim 4, wherein the high-frequency generator is further configured to control each of said switches coupled to the lower signal line of said bridge unit to an off state while controlling the corresponding switch unit coupled to the upper signal line of said bridge unit to an on state, and vice versa.

6. The invention in accordance with claim 2 wherein the voltage signal level across said bridge capacitor is substantially equal to a greater of peak to peak mains voltage supply swing and peak to peak lamp voltage swing.

7. In an electronic ballast circuit for driving a gas discharge lamp from a mains voltage signal supply, a ballast bridge unit having an upper and lower signal line comprises:

a storage capacitor divider coupled across said upper and lower bridge unit signal lines said capacitor divider forming a reference voltage common terminal;

an input converter bridge having at least two switches coupled in series at an input common terminal, wherein an upper switch of said input converter bridge is coupled to the upper signal line of the ballast bridge unit and the lower switch of said input converter bridge is coupled to the lower signal line of the ballast bridge unit;

an output converter bridge having at least two switches coupled in series at an output common terminal, wherein an upper switch of said output converter bridge is coupled to the upper signal line of the ballast bridge unit and the lower switch is coupled to the lower signal line of the ballast bridge unit, wherein a first differential voltage signal is formed between said common input terminal and said reference voltage common terminal and a second differential voltage signal is formed between said common output terminal and said reference voltage common terminal; and a high-frequency generator that is configured to alternately switch the at least two switches of the output converter bridge to form the second differential voltage signal for driving the gas discharge lamp.

8. The invention in accordance with claim 7 wherein said switches of said ballast bridge unit are high frequency switching transistors.

9. The invention in accordance with claim 8, wherein said common terminal of said input converter bridge is coupled to an input inductor, and said common terminal of said output converter bridge is coupled to an output inductor and said common terminal of said reference voltage common terminal is coupled to one terminal of a mains power supply line.

10. The invention in accordance with claim 8, wherein the high-frequency generator is further configured to change the operation of the output converter bridge between a first and a second duty cycle at a rate defined by frequency of current signal driving said gas discharge lamp.

11. The invention in accordance with claim 10, wherein the high-frequency generator is further configured to control each of said switches coupled to the lower signal line of said bridge unit to an off state while controlling the corresponding switch unit coupled to the upper signal line of said bridge unit to an on state, and vice versa.

12. The invention in accordance with claim 8 wherein the voltage signal level across said capacitor divider is substantially equal to a greater of peak to peak mains voltage supply swing and peak to peak lamp voltage swing.

13. In a ballast circuit for driving a gas discharge lamp from a mains voltage supply line, said ballast circuit having a ballast bridge unit having an input converter bridge coupled in parallel with an output converter bridge and a reference voltage signal bridge, a method for operating said ballast circuit comprising the steps of:

forming a voltage bus signal $V_{bus}$ across a capacitor disposed in parallel with said signal bridges;

forming an average voltage signal level at a common input terminal of said input converter bridge;

shifting an average voltage signal at a common output terminal between two desired levels so as to form an ac current for driving the gas discharge lamp; and forming a reference voltage signal at a common terminal of said reference voltage signal bridge via a high speed switching within the reference voltage signal bridge at a switching frequency that is substantially higher than a frequency of the mains voltage, so as to form a first differential voltage signal between the common input terminal voltage signal and the reference voltage signal and to form a second differential voltage signal between the common output terminal voltage signal and the reference voltage signal for driving the gas discharge lamp.

14. The method in accordance with claim 13 further comprising the step of active switching transistor switches of said signal bridges so as to form desired voltage signals at said common terminals of said bridge unit.

15. The method in accordance with claim 14 further comprising the step of changing the operation of said output converter switch coupled to the upper signal line of said bridge unit between a first and a second duty cycle at a rate defined by frequency of current signal driving said gas discharge lamp.

* * * * *